(12) United States Patent
Priscal et al.

(10) Patent No.: US 9,694,959 B2
(45) Date of Patent: Jul. 4, 2017

(54) BLISTER PACKAGING COMPONENTS

(71) Applicant: BEMIS COMPANY, INC., Neenah, WI (US)

(72) Inventors: Michael D. Priscal, Neenah, WI (US); Arthya Puguh, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 15/310,856

(22) PCT Filed: Jun. 6, 2014

(86) PCT No.: PCT/US2014/041212
§ 371 (c)(1),
(2) Date: Nov. 14, 2016

(87) PCT Pub. No.: WO2015/187173
PCT Pub. Date: Dec. 10, 2015

(65) Prior Publication Data
US 2017/0081099 A1   Mar. 23, 2017

(51) Int. Cl.
*B65D 75/32* (2006.01)
*B32B 27/08* (2006.01)
(Continued)

(52) U.S. Cl.
CPC ............ *B65D 75/327* (2013.01); *B32B 27/08* (2013.01); *B32B 27/302* (2013.01); *B32B 27/32* (2013.01);
(Continued)

(58) Field of Classification Search
CPC ..... B65D 75/327; B32B 27/325; B32B 27/32; B32B 27/302; B32B 27/36; B32B 27/08;
(Continued)

(56) References Cited

U.S. PATENT DOCUMENTS 3,912,082 A   10/1975   Gerner et al.
4,884,693 A   12/1989   Brutsch
(Continued)

FOREIGN PATENT DOCUMENTS

EP   1300238 A3   6/2004
EP   1398149 81   5/2007
(Continued)

*Primary Examiner* — Michael C Miggins
(74) *Attorney, Agent, or Firm* — Lynn M. Nett

(57) ABSTRACT

The present invention relates to blister components for blister packages formed from multilayer thermoplastic films. In one preferred embodiment of the present invention, the blister component has a layer sequence configuration of A/B/C/B/A. Preferably, layer A is a first exterior layer comprising cyclic olefin copolymer (COC), layer B is an interior layer comprising a high density polyethylene (HDPE), a blend of high density polyethylene, a high density polyethylene nucleation additive and optionally, a hydrocarbon resin (HDPE-Blend), or a bimodal high density polyethylene having a distribution of a low molecular weight region and a high molecular weight region (HDPE-Bimodal), or a high density polyethylene having a thickness of between 38.1 pm to 190.5 pm (1.5 mil to 7.5 mil), layer C is a central core layer. Alternatively, the blister component has a layer sequence configuration of A/B/C/B/D, where layer D is a second exterior layer.

15 Claims, 5 Drawing Sheets

(51) Int. Cl.
*B32B 27/30* (2006.01)
*B32B 27/32* (2006.01)
*B32B 27/36* (2006.01)

(52) U.S. Cl.
CPC ............ *B32B 27/325* (2013.01); *B32B 27/36* (2013.01); *B32B 2270/00* (2013.01); *B32B 2307/558* (2013.01); *B32B 2307/702* (2013.01); *B32B 2553/00* (2013.01)

(58) Field of Classification Search
CPC .......... B32B 2270/00; B32B 2307/702; B32B 2553/00; B32B 2307/558
See application file for complete search history.

(56) References Cited

U.S. PATENT DOCUMENTS

| | | | |
|---|---|---|---|
| 5,783,273 A | 7/1998 | Yamamoto et al. | |
| 5,876,814 A | 3/1999 | Oda et al. | |
| 6,632,910 B2 | 10/2003 | Takagi et al. | |
| 6,682,797 B1 | 1/2004 | Otoi et al. | |
| 7,288,316 B2 | 10/2007 | Jester | |
| 7,383,671 B2 | 6/2008 | Conti | |
| 7,829,633 B2 | 11/2010 | Heukelbach et al. | |
| 8,092,877 B2 | 1/2012 | Jester et al. | |
| 8,377,529 B2 | 2/2013 | Bekele | |
| 2002/0012781 A1 | 1/2002 | Beer et al. | |
| 2005/0186373 A1* | 8/2005 | Rhee | B32B 27/32 428/35.7 |
| 2007/0202337 A1 | 8/2007 | Lischefski et al. | |
| 2007/0212539 A1* | 9/2007 | Yamada | B32B 27/08 428/383 |
| 2007/0259142 A1 | 11/2007 | Lischefski et al. | |
| 2008/0311370 A1 | 12/2008 | Tatarka | |
| 2010/0121290 A1 | 5/2010 | Rasmussen et al. | |
| 2011/0104342 A1 | 5/2011 | Glaser et al. | |
| 2012/0107542 A1 | 5/2012 | Nelson et al. | |

FOREIGN PATENT DOCUMENTS

| | | | | |
|---|---|---|---|---|
| WO | WO 2007104513 A1 * | 9/2007 | ............ | B32B 27/32 |
| WO | WO 2013116445 A1 * | 8/2013 | ............... | B32B 7/12 |

* cited by examiner

BLISTER PACKAGING COMPONENTS

BACKGROUND OF THE INVENTION

The present invention relates generally to blister packaging and more particularly, to blister components for blister packaging formed from multilayer thermoplastic films where a low moisture vapor transmission rate is desired.

Blister packaging is employed widely for commercial packaging of food products, personal care products, and human health products such as pharmaceuticals, and medical devices or precision instruments. The use of this type of packaging has become widespread mainly due to the ability in incorporate suitable moisture, dust, UV and/or gas barriers into the packages when such properties are desired for maintaining the product contained therein. For example, blister packaging is extensively used in the pharmaceutical industry for packaging of medicaments or the like in capsule, lozenge, or pill form because the integrity of the medicament can be maintained through the proper selection of materials used to form the packages.

For preparing blister packages or so-called push through packages, generally a thermoplastic film is first processed by vacuum forming or pneumatic forming so as to form blisters or cavities thereon, namely portions having a predetermined contour corresponding to each specific article to be received therein. After the so-blistered film has been solidified, each blister is charged with each piece of the article to be packaged and a second or lidding film is then covered over each blister and sealed to the first film. The second lidding film is often a laminate material which can be ruptured by a simple finger-rupture or peeled off from the first film to allow access to a packaged item. Conventional materials used for forming the blistered film have included transparent plastics such as polyvinylchloride (PVC), polyvinylidene chloride (PVdC) and polychlorotrifluoroethylene (PCTFE), commonly referred to as ACLAR® (Honeywell/Allied Signal). Packaging for pharmaceuticals or other moisture-sensitive articles require not only low moisture permeability but also other properties such as chemical inertness, clarity, rigidity, or uniform thickness. The use of polyvinylchloride (PVC) and polyvinylidene chloride (PVdC) have been shown to have poor and/or insufficient moisture-proofing properties required by the pharmaceutical industry. While ACLAR® exhibits relatively low moisture vapor transmission, its use in blister packaging is inherently costly.

There is therefore a need in the art for improved blister packaging materials which provides sufficient moisture vapor barrier and chemical inertness properties and is aesthetically pleasing enough to present the products contained therein while being cost effective to be manufactured.

SUMMARY OF THE INVENTION

The present invention is directed to blister components for blister packages formed from a multilayer thermoplastic film. As used throughout this disclosure, the term "blister component" refers to multilayer thermoplastic film or a roll of multilayer thermoplastic film both of which may be thermoformed, partially thermoformed or not thermoformed at all. In one embodiment of the present invention, the sequence of layers in the multilayer thermoplastic film of the blister component is palindromic. As used throughout this application, the term "palindromic" refers to a multilayer film, the layers of which are substantially symmetrical. Non-limiting examples of palindromic films are film or sheet having the layer sequence of configurations: A/B/A or A/B/B/A or A/B/C/B/A or A/B/C/D/C/B/A or A/B/C/B/D/B/C/B/A or A/B/E/D/E/B/C/B/E/D/E/B/A, etc. An example of a layer sequence configuration of a non-palindromic film would be A/B/C or A/B/C/A. A palindromic thermoplastic film may be coextruded as a symmetrical cast or blown film using coextrusion methods generally well known in the art. An alternative method of producing palindromic films is by the use of blown coextrusion of non-symmetrical film or sheet structures followed by collapsing the blown bubble around a central core layer.

In another embodiment of the present invention, the sequence of layers in the multilayer thermoplastic film of the blister component is non-palindromic.

In one generic embodiment, the thermoformed blister component of the present invention may be characterized as a palindromic film for wed from a non-symmetrical film having a generic layer sequence configuration of A/B/C which is coextruded by blown film coextrusion techniques and collapsed upon itself to produce a layer sequence configuration of A/B/C/B/A. In this embodiment, the thermoformed blister component includes a film where layer A is an exterior layer comprising a cyclic olefin copolymer (COC), layer B is an interior layer comprising a high density polyethylene (HDPE), a blend of high density polyethylene, a high density polyethylene nucleation additive and optionally, a hydrocarbon resin, a bimodal high density polyethylene having a distribution of a low molecular weight region and a high molecular weight region, or a high density polyethylene (HDPE) and has a thickness of between 38.1 μm to 190.5 μm (1.5 mil to 7.5 mil), and layer C is a central core layer. The central core layer C may be any suitable polymeric material which can be blown coextruded and collapsed upon itself. One non-limiting example of such materials is ethylene vinyl acetate copolymer (EVA).

In another generic embodiment, the thermoformed blister component of the present invention may be characterized as a non-palindromic film having a layer sequence configuration of A/B/C/B/D which is coextruded by blown film coextrusion techniques and is not collapsed upon itself. In this embodiment, the thermoformed blister component includes a film where layer A is an exterior layer comprising a material selected from the group consisting of cyclic olefin copolymer (COC), layer B is an interior layer comprising a high density polyethylene (HDPE), a blend of high density polyethylene, high density polyethylene nucleation additive and optionally, a hydrocarbon resin (HDPE-Blend), a bimodal high density polyethylene having a distribution of a low molecular weight region and a high molecular weight region (HDPE-Bimodal), or a high density polyethylene and has a thickness of between 381 μm to 190.5 μm (1.5 mil to 7.5 mil), layer C is a central core layer, and D is an exterior layer comprising a different material than layer A and is selected from the group consisting of polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate PETG) and polylactic acid (PLA). Core layer C may be any thermoplastic material. In one preferred embodiment, core layer C comprises ethylene vinyl acetate copolymer (EVA).

It should be understood that in the above-described generic embodiments, the thermoformed blister component may include additional film layers.

The blister packages of the present invention may also include a lidding component which is heat-sealable to the exterior layer A of the blister component. In one embodiment, the lidding component comprises a thermoplastic resin heat-sealable to cyclic olefin copolymer.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Figure 1:
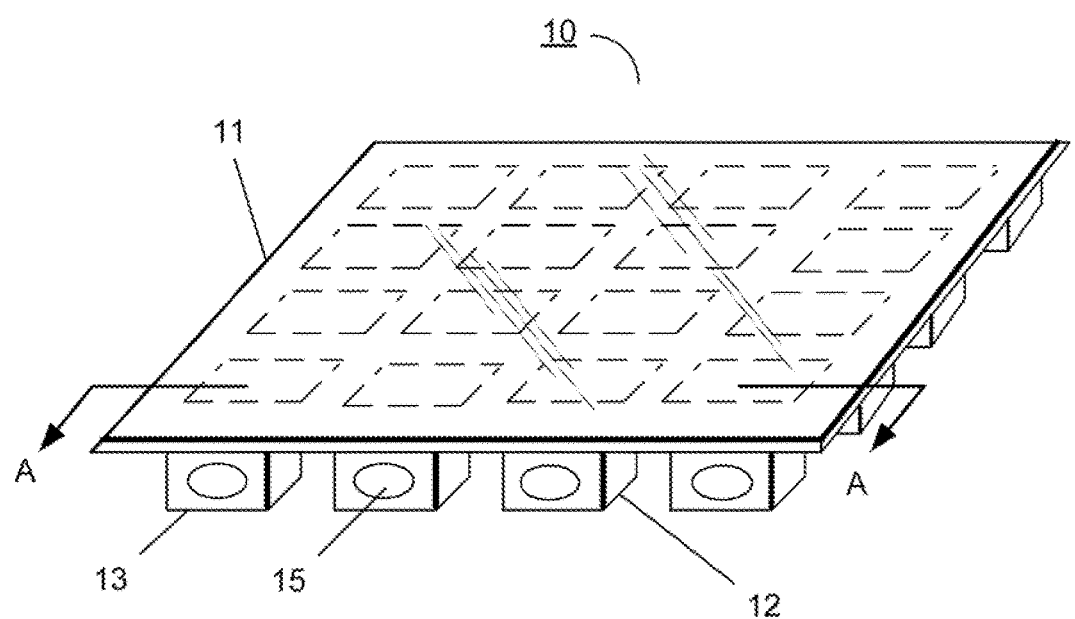
FIG. 1 illustrates a schematic view of one embodiment of a blister package according to the present invention.
Figure 2:
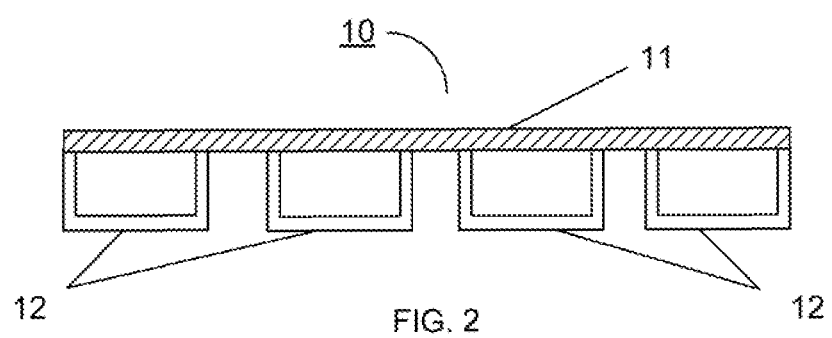
FIG. 2 illustrates an exploded view taken along line A-A of FIG. 1 depicting the blister and lidding components of the present invention.

In accordance with the practice of the present invention, a representative blister package 10 as described herein is shown in FIGS. 1 and 2. Package 10 of the present invention comprises a thermoformed blister component 11 and a lidding component 12, the former provided with one or more thermoformed pockets 13 surrounded by sealed flange regions 14. Pocket 13 defines an individual compartment for receiving a product 15, such as a tablet.

In accordance with an important aspect of the present invention, the thermoformed blister component 11 comprises a multilayer thermoplastic film. It will be appreciated that the multilayer thermoplastic film of the thermoformed blister component 11 may include any number of film layers and film layer compositions depending upon both functional and aesthetic requirements of the blister component. It is desirable that multilayer thermoplastic film includes one or more film layers which are barrier materials and substantially chemically insert when in contact with a product. The term "barrier" refers to a material that controls permeability of one or more elements through a film structure including moisture, chemicals, heat, odor and oxygen or other gases. As it relates to the present invention, a barrier material can be provided by a single film layer or multiple film layers acting individually or in concert with each other, respectively. The phrase "substantially chemically insert" refers to materials that generally are not reactive with the product with which it comes into contact with and does not leech chemical ingredients into the product with which it comes into contact. Preferably, thermoformed blister component 11 comprises a multilayer thermoplastic film which provides an average water vapor transmission rate of less than 0.500 g/m²/clay or less than 0.250 g/m²/day or less than 150 g/m²/day or about 0.131 or about 0.110 g/m²/day at 100° F. (37.8° C.) and 90% relative humidity having a thickness of about 10 mil (254 micron) before being thermoformed. The aforementioned features of the present invention may be achieved by a multilayer thermoplastic film comprising at least 3 or 4 or 5 or 6 or 7 or 8 or 9 or 10 or 11 or 12 or 13 or more layers.

Figure 3:
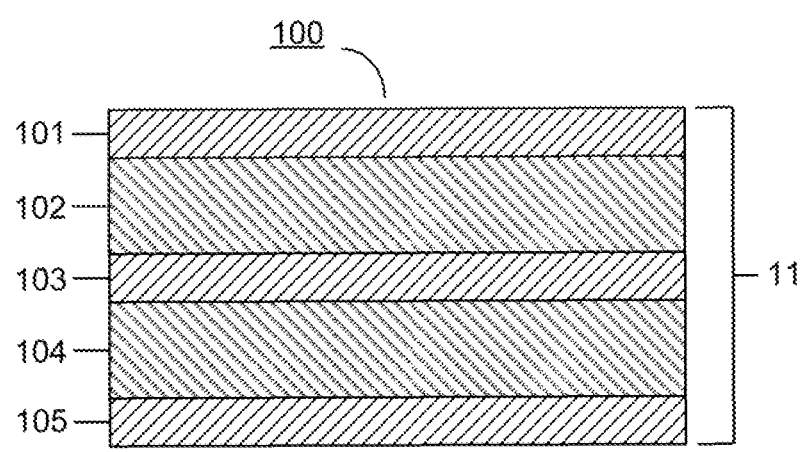
FIG. 3 illustrates a cross-sectional view of one embodiment of a blister component according to the present invention.

In one embodiment as depicted in FIG. 3, thermoformed blister component 11 comprises a multilayer thermoplastic film 100 comprising a five-layer structure of a first exterior layer 101, a first interior layer 102, a central core layer 103, a second interior layer 104, and a second exterior layer 105. In one embodiment, first and second exterior layers 101 and 105 comprise the same materials. In another embodiment, first and second exterior layers 101 and 105 comprise different materials.

For example, in one preferred embodiment, first and second exterior layers 101 and 105 each comprise the same material of cyclic olefin copolymer (COC), a first and second interior layers 102 and 104 each comprise high density polyethylene (HDPE), a blend of a high density polyethylene, a high density polyethylene nucleation additive and optionally, a hydrocarbon resin (HDPE-Blend), a high density polyethylene (HDPE) and has a thickness of between 38.1 μm to 190.5 μm (1.5 mil to 7.5 mil), or a bimodal high density polyethylene having a distribution of a low molecular weight region and a high molecular weight region (HDPE-Bimodal), and a core layer 103 comprising ethylene vinyl acetate copolymer (EVA). Alternatively, the first exterior layer 101 comprises cyclic olefin copolymer (COC) and the second exterior layer 105 comprises a different material than first exterior layer 101 which is selected from the group consisting of polypropylene (PP), aromatic polyesters such as, but not limited to, polyethylene terephthalate (PET), oriented polyethylene terephthalate (OPET), amorphous polyethylene terephthalate (APET), glycol-modified polyethylene terephthalate (PETE), aliphatic polyesters such as, but not limited to, polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); or polystyrenes such as, but not limited to, high impact polystyrene (HIPS), general purpose polystyrene (GPPS), and styrene block copolymer (SBC).

As used herein, the phrase "cyclic olefin copolymer" refers to copolymers having at least one norbornene structural moiety within the repeating backbone of the polymer. Suitable COCs for use in the present invention may have a heat deflection temperature under load (0.45 MPa) of about 75° C. or 130° C. or 150° C., or 170° C. Exemplary of commercially available cyclic olefin copolymers include, but are not limited to, the TOPAS® family of resins which is supplied by Celanese Corporation (Irving, Tex., USA).

As used throughout this application, the term "polypropylene" refers to a homopolymer or copolymer having a propyl or C-3 linkage between monomer units. A non-limiting example of a suitable propylene copolymer is Propylene 4170 available from Total Petrochemicals USA, Inc (Houston, Tex.) Other non-limiting examples of polypropylenes include Polypropylene 3287WZ, which is available from Total Petrochemicals USA, Inc. (Houston, Tex.); and H02C-00 Polypropylene Homopolymer, which is available from Ineos Olefins & Polymers USA (League City, Tex.).

As used throughout this application, the term "polyester" refers to a homopolymer or copolymer having an ester linkage between monomer units which may be formed, for example, by condensation polymerization reactions between a dicarboxylic acid and a diol. The ester linkage can be represented by the general formula: [O—R—OC(O)—R—C(O)], where R and R' are the same or different alkyl (or aryl) group and may be generally formed from the polymerization of dicarboxylic acid and diol monomers containing both carboxylic acid and hydroxyl moieties. The dicarboxylic acid (including the carboxylic acid moieties) may be linear or aliphatic (e.g., lactic acid, oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid and naphthalic acid). Specific examples of a useful diol include but are not limited to ethylene glycol, propylene glycol, trimethylene glycol, 1,4-butane diol, neopentyl glycol, cyclohexane diol and the like. Polyesters may include a homopolymer or copolymer of alkyl-aromatic esters including but not limited to polyethylene terephthalate (PET), amorphous polyethylene terephthalate (APET), crystalline polyethylene terephthalate (CPET), glycol-modified polyethylene terephthalate (PETG) and polybutylene terephthalate; a copolymer of terephthalate and isophthalate including but not limited to polyethylene terephthalate/isophthalate copolymer. Aliphatic esters include but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials. A non-limiting example of PETG is Eastar™ Copolyester 6763, which is also available from Eastman Chemical Company (Kingsport, Tenn.).

As used herein, the term "polylactic acid" is used synonymously throughout this disclosure to describe homopolymers or copolymers having an ester linkage between monomer units and can be represented by the general formula: $[-OCH(R)C(O)-]_n$ where $R=CH_3$. Polylactic acid may be fabricated by polymerizing lactic acid, which is mostly produced from by carbohydrate fermentation of corn. Polylactic acid may be also produced by polymerization of lactide which obtained by condensation of two lactic acid molecules. Polylactic acid has a glass transition temperature of ranges from 50-80° C., while the melting temperature ranges from 130-180° C. Polylactic acid is known by those skilled in the art and fully disclosed in U.S. Pat. Nos. 5,698,322; 5,142,023; 5,760,144; 5,593,778; 5,807,973; and 5,010,145, the entire disclosure of each of which is hereby incorporated by reference. Examples of commercially available polylactic acid are sold under the trademark NatureWorks™ PLA Polymer in grades 4031-D, 4032-D, and 4041-D from Cargill Dow LLC, Minneapolis, Minn., U.S.A.

As used throughout this application, the term "polystyrene" or "PS" refers to a homopolymer or copolymer having at least one styrene repeating linkage (such as benzene (i.e., $C_6H_5$) having an ethylene substituent) within the repeating backbone of the polymer. The styrene linkage can be represented by the general formula: $[CH_2-CH_2(C_6H_5)]_n$. Polystyrene may be formed by any method known to those skilled in the art. Examples of styrenic polymers include but are not limited to high impact polystyrene (HIPS), general purpose polystyrene (GPPS) and styrene block copolymer (SBC). HIPS is sometimes called rubber-modified polystyrene and is normally produced by copolymerization of styrene and a synthetic rubber. (See Wagner, et al., "Polystyrene," The Wiley Encyclopedia of Packaging Technology, Second Edition, 1997, pp. 768-771 (John Wiley & Sons, Inc., New York, N.Y.), which is incorporated in its entirety in this application by this reference.) Examples of HIPS include but are not limited to Impact Polystyrene 825E and Impact Polystyrene 945E, both of which are available from Total Petrochemicals USA, Inc; EB6025 Rubber Modified High Impact Polystyrene, which is available from Chevron Phillips Company (The Woodlands, Tex.); and 6210 High Impact Polystyrene, which is available from Ineas Nova LLC (Channahon. Ill.). GPPS is often called crystal polystyrene, as a reference to the clarity of the resin. Examples of GPPS include but are not limited to Crystal Polystyrene 524B and Crystal Polystyrene 525B, both of which are available from Total Petrochemicals USA, Inc. Styrene block copolymers (SBC) include styrene butadiene copolymers (SB). The styrene-butadiene copolymers that are suitable for packaging applications are those resinous block copolymers that typically contain a greater proportion of styrene than butadiene and that are predominantly polymodal with respect to molecular weight distribution. (See Hartsock, "Styrene-Butadiene Copolymers," The Wiley Encyclopedia of Packaging Technology, Second Edition, 1997, pp, 863-664 (John Wiley & Sons, Inc., New York, N.Y.), which is incorporated in its entirety in this application by this reference.) A non-limiting example of SB is DK13 K-Resin® Styrene-Butadiene Copolymer, which is available from Chevron Phillips Chemical Company (The Woodlands, Tex.).

In one preferred embodiment, first and second exterior layers 101 and 105 each comprise at least 50% or at least 60% or at least 70% or at least 80% or at least 90% or at least 95% cyclic olefin copolymer (COC) relative to the total weight of the layer, and first and second interior layers 102 and 104 each comprise high density polyethylene (HDPE).

As used herein, the phrase "high density polyethylene" or "HDPE" refers to homopolymers of ethylene that have densities of about 0.960 g/cm$^3$ to about 0.970 g/cm$^3$ as well as copolymers of ethylene and an alpha-olefin (such as 1-butene or 1-hexene) that have densities of about 0.940 g/cm$^3$ to about 0.958 g/cm$^3$. In contrast, a low density polyethylene (LDPE) generally has a density of about 0.915 g/cm$^3$ to about 0.930 g/cm$^3$. HDPE is inclusive of polymers made with Ziegler or Phillips type catalysts and polymers made with single-site metallocene catalysts. A non-limiting example of high density polyethylene includes Alathon® M6020 from Equistar Chemicals LP (Houston, Tex.). Other specific non-limiting examples of HDPE include Alathon® M6020 available from Equistar Chemicals LP (Houston, Tex.); Alathon® L5885 available from Equistar Chemicals LP (Houston, Tex.); ExxonMobil™ HDPE HD 7925.30 available from ExxonMobil Chemical Company (Houston, Tex.); and ExxonMobil™ HDPE HD 7845.30 available from ExxonMobil Chemical Company (Houston, Tex.).

In another preferred embodiment, first exterior layer 101 comprises at least 50%, 60%, 70%, 80%, 90%, 95% relative to the total weight of the layer of cyclic olefin copolymer (COC), second exterior layer 105 comprises at least 50%, 60%, 70%, 80%, 90%, 95% of relative to the total weight of the layer of a different material selected from the group consisting of polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate PETG) or polylactic acid (PLA), and first and second interior layers 102 and 104 each comprise high density polyethylene (HDPE) and has a thickness of at least 20% or at least 25% or at least 30% or at least 35% of the total thickness of the multilayer thermoplastic film 100.

In still another preferred embodiment, first exterior layer 101 comprises at least 50%, 60%, 70%, 80%, 90%, 95% relative to the total weight of the layer of cyclic olefin copolymer (COC), second exterior layer 105 comprises at least 50%, 60%, 70%, 80%, 90%, 95% of relative to the total weight of the layer of a different material selected from the group consisting of polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate PETG) and polylactic acid (PLA), and first and second interior layers 102 and 104 each comprise high density polyethylene (HDPE) and has a thickness of between 38.1 μm to 190.5 μm (1.5 mil to 7.5 mil).

In another preferred embodiment, first and second interior layers 102 and 104 each comprise a blend of a high density polyethylene and a high density polyethylene nucleation additive (HDPE-Blend). As used herein, the phrase "nucleation additive" means a material that increases high density polyethylene crystallinity as a result of its incorporation into HDPE. Such nucleation additives typically provide better control over crystallization rates. Examples of nucleation additives include minerals such as chalk, talc, clay, kaolin, silicates and the like, and organic agents such as salts of aliphatic or aromatic carboxylic acids, aromatic salts, metallic salts of aromatic phosphorous compounds, quinaridones, and aromatic amides. Further examples include zinc glycerolate, calcium glycerolate, calcium hexahydrophthalate, zinc hexahydrophthalate, salts and the like, and mixtures thereof. In one embodiment, the nucleation additive comprises calcium hexahydrophthalate. In one embodiment, the nucleation additive is present in each interior layer of HDPE from about 0.2% to about 3.5% by weight of the layer.

In still another preferred embodiment, first exterior layer 101 comprises at least 50%, 60%, 70%, 80%, 90%, 95% relative to the total weight of the layer of cyclic olefin copolymer (COC), second exterior layer 105 comprises at least 50%, 60%, 70%, 80%, 90%, 95% of relative to the total weight of the layer of a different material selected from the group consisting of polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate PETG) or polylactic acid (PLA). In this embodiment, first and second interior layers 102 and 104 each comprise a blend of a high density polyethylene, a high density polyethylene nucleation additive and/or a hydrocarbon resin (HDPE-Blend). The hydrocarbon resin may be present in first and second interior layers 102 and 104 from about 3% to about 16% by weight of the layer. As used herein, the phrase "hydrocarbon resin" refers to a product produced by polymerization from coal tar, petroleum, and turpentine feed stocks, as defined by ISO Standard 472, "Plastics Vocabulary" incorporated by reference herein to the extent that it teaches hydrocarbon resins. A hydrocarbon resin may comprise any of those hydrocarbon resins disclosed in U.S. Pat. No. 6,432,496, issued Aug. 13, 2002, or in U.S. Patent Application 2008/0286547, published Nov. 20, 2008, both of which are incorporated in their entireties in this application by this reference. More specifically, as a non-limiting example, the hydrocarbon resin may include petroleum resins, terpene resins, styrene resins, cyclopentadiene resins, saturated alicyclic resins or mixtures of such resins. Additionally, as a non-limiting example, the hydrocarbon resin may comprise hydrocarbon resin derived from the polymerization of olefin feeds rich in dicyclopentadiene (DCPD), from the polymerization of olefin feeds produced in the petroleum cracking process (such as crude $C_9$ feed streams), from the polymerization of pure monomers (such as styrene, α-methylstyrene, 4-methylstyrene, vinyltoluene or any combination of these or similar pure monomer feedstocks), from the polymerization of terpene olefins (such as α-pinene, β-pinene or d-limonene) or from a combination of such. The hydrocarbon resin may be fully or partially hydrogenated. Specific examples of hydrocarbon resins include but are not limited to Plastolyn® 81140 Hydrocarbon Resin available from Eastman Chemical Company (Kingsport, Tenn.), Regalite® T1140 available from Eastman Chemical Company (Kingsport, Tenn.), Arkon® P-140 available from Arakawa Chemical Industries, Limited (Osaka, Japan) and Piccolyte® S135 Polyterpene Resins available from Hercules Incorporated (Wilmington, Del.).

In yet another preferred embodiment, first exterior layer 101 comprises at least 50%, 60%, 70%, 80%, 90%, 95% relative to the total weight of the layer of cyclic olefin copolymer (COC), second exterior layer 105 comprises at least 50%, 60%, 70%, 80%, 90%, 95% of relative to the total weight of the layer of a different material selected from the group consisting of polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate (PETG) and polylactic acid (PLA), and first and second interior layers 102 and 104 each comprise high density polyethylene having a bi-modal molecular weight having a distribution of a low molecular weight region and a high molecular weight region (HDPE-Bimodal).

In one preferred embodiment, the central core layer 103 comprises an ethylene vinyl acetate copolymer (EVA) and more preferably, an ethylene vinyl acetate copolymer (EVA) having a 12% by weight vinyl acetate content. Non-limiting examples of EVA include Escorenem™ Ultra LD 705.MJ available from ExxonMobil Chemical Company (Houston, Tex.), Escorene™ Ultra LD 768.MJ available from ExxonMobil Chemical Company (Houston, Tex.) and Ateva® 2861AU available from Celanese Corporation (Edmonton, Alberta, Canada).

These five-layer embodiments described above may include, but are not limited to the following layer sequences and general layer compositions: COC/HDPE/EVA/HDPE/COC; COC/HDPE-Blend/EVA/HDPE-Blend/COC; COC/HDPE-Bimodal/EVA/HDPE-Bimodal/COC; COC/HDPE/EVA/HDPE/PP; COC/HDPE-Blend/EVA/HDPE-Blend/PP; COC/HDPE-Bimodal/EVA/HDPE-Bimodal/PP; COC/HDPE/EVA/HDPE/PETG; COC/HDPE-Blend/EVA/HDPE-Blend/PETG; COC/HDPE-Bimodal/EVA/HDPE-Bimodal/PETG; COC/HDPE/EVA/HDPE/APET; COC/HDPE-Blend/EVA/HDPE-Blend/APET; COC/HDPE-Bimodal/EVA/HDPE-Bimodal/APET; COC/HDPE/EVA/HDPE/PET; COC/HDPE-Blend/EVA/HDPE-Blend/PET; COC/HDPE-Bimodal/EVA/HDPE-Bimodal/PET; COC/HDPE/EVA/HDPE/OPET; COC/HDPE-Blend/EVA/HDPE-Blend/OPET; COC/HDPE-Bimodal/EVA/HDPE-Bimodal/OPET; COC/HDPE/EVA/HDPE/PLA; COC/HDPE-Blend/EVA/HDPE-Blend/PLA; COC/HDPE-Bimodal/EVA/HDPE-Bimodal/PLA; COC/HDPE/EVA/HDPE/HIPS; COC/HDPE-Blend/EVA/HDPE-Blend/HIPS; COC/HDPE-Bimodal/EVA/HDPE-Bimodal/HIPS; COC/HDPE/EVA/HDPE/GPPS; COC/HDPE-Blend/EVA/HDPE-Blend/GPPS; COC/HDPE-Bimodal/EVA/HDPE-Bimodal/GPPS;

COC/HDPE/EVA/HDPE/SBC; COC/HDPE-Blend/EVA/HDPE-Blend/SBC; and COC/HDPE-Bimodal/EVA/HDPE-Bimodal/SBC.

It should be understood that the above examples may further include a tie layer comprising a tie layer material between a high density polyethylene layer and the second exterior layer comprising polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate (PETG) or polylactic acid (PLA). The phrase "tie layer material" may include, but not limited to, unmodified polyolefins such as polyethylenes and ethylene vinyl acetate copolymers, unmodified ester copolymers such as ethylene acrylate copolymers and ethylene methacrylate copolymers and unmodified ethylene acid copolymers such as ethylene acrylic acid copolymers and blends thereof. Tie layer materials may also include modified polyolefins including, but not limited to anhydride modified polyethylenes, anhydride modified ethylene vinyl acetate copolymers, modified ester copolymers such as anhydride modified ethylene acrylate copolymers, modified ethylene acid copolymers such as anhydride modified ethylene acrylic acid copolymers and blends thereof. Tie layer materials may further include a blend of an unmodified polyolefin or unmodified ester copolymer or unmodified ethylene acid copolymer and a modified polyolefin or modified ester copolymer or modified ethylene acid copolymer. In a preferred embodiment, a tie layer may be present between a layer comprising high density polyethylene and the second exterior layer comprising polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate (PETG) or polylactic acid (PLA).

Figure 4:
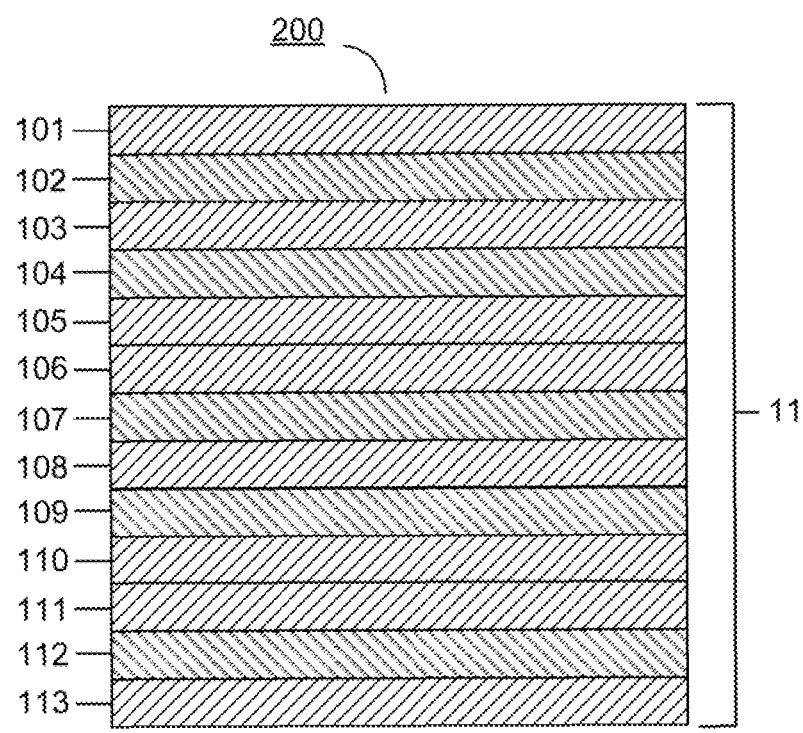
FIG. 4 illustrates a cross-sectional view of another embodiment of a blister component according to the present invention.

In another preferred embodiment as depicted in FIG. 4, thermoformed blister component 11 comprises a multilayer palindromic thermoplastic film 200 which comprises a thirteen-layer symmetrical structure of a first exterior layer 201, a first interior layer 202, a second interior layer 203, a third interior layer 204, a fourth interior layer 205, a fifth interior layer 206, a sixth interior layer 207, a central core layer 208, a seventh interior layer 209, an eighth interior layer 210, a ninth interior layer 211, a tenth interior layer 212, an eleventh interior layer 213, and a second exterior layer 214. In this embodiment, film 200 comprises two exterior layers each comprising cyclic olefin copolymer (COC), two discrete interior layers each comprising ethylene vinyl alcohol copolymer (EVOH), and four discrete interior layers each comprising high density polyethylene (HDPE). This thirteen-layer embodiment has the following layer sequence and general layer composition: COC/HDPE/tie/EVOH/tie/HDPE/EVA/HDPE/tie/EVOH/tie/HDPE/COC.

The total thickness of multilayer thermoplastic films of the thermoformed blister component 11 of the present invention is generally from about 12.7 μm (0.5 mil) to about 508 μm (20 mil), typically from about 50.8 μm (2 mil) to about 254 μm (10 mil), most typically from about 76.2 μm (3 mil) to about 2032 μm (8 mil).

Figure 5:
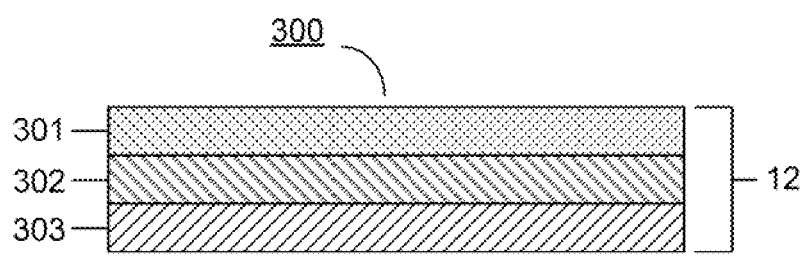
FIG. 5 illustrates a cross-sectional view of one embodiment of a lidding component according to the present invention.

In accordance with the practice of the present invention, one embodiment of a lidding component 12 of the present invention is depicted in FIG. 5. In this embodiment, lidding component 12 comprises a laminate 300 having a first exterior layer 301, an interior layer 302 and a second exterior layer 303. Preferably, second exterior layer 303 comprises a thermoplastic resin heat-sealable to cyclic olefin copolymer, first exterior layer 301 comprises a metal foil such as aluminum, and interior layer 302 comprises a tie or adhesive material bonding exterior layers 301 and 303 together.

The above description and the following examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

WORKING EXAMPLES

Thermoformed Blister Component-Palindromic Film Examples

The following example illustrates a certain particular embodiment of palindromic multilayer thermoplastic film structure suitable for use in the present invention and is not to be interpreted as limiting. In the following example, polymeric resin composition percentages are based on the total weight of each film layer. In the following example, the film structure was produced using a single-bubble coextrusion apparatus and method which are well known to those skilled in the art. The single-bubble blown coextrusion film apparatus included a multi-manifold circular die head for bubble blown film through which a non-palindromic film composition was forced through and formed into a cylindrical bubble. The film bubble was immediately quenched e.g., via cooled water bath, solid surface and/or air, and then ultimately collapsed onto itself and formed into a palindromic film.

Example 1-1

Example 1-1 is one embodiment of a palindromic thermoplastic film 100 as illustrated in FIG. 3 having a structure and layer compositions as described below:

Layer 101 was 100% by weight of a cyclic olefin copolymer (COC) having density of 1010 kg/m3, a heat deflection temperature under load (0.45 MPa) of about 75° C. and a glass transition temperature of 78° C. Exemplary of such a commercially available COC is TOPAS® 8007S-04 supplied by Celanese Corporation (Irving, Tex., USA) This layer had a thickness of approximately 15.24 μm (0.60 mil).

Layer 102 was a blend of 99% by weight of a high density polyethylene (HDPE) having density of 0.966 g/cm³ and 1% by weight of a high density polyethylene masterbatch comprising 4% by weight of a high density polyethylene nucleation additive. Exemplary of a commercially available HDPE is SURPASS® HP167-AB supplied by Nova Chemical Company (Joffre, Alberta, Canada). SURPASS® HP167-AB is believed to be an example of a bimodal high density polyethylene having a distribution of a low molecular weight region and a high molecular weight region. Exemplary of a commercially available high density polyethylene masterbatch having a 4% high density polyethylene nucleation additive is POLYBATCH® CLR 124 supplied by A Schulman (Fairlawn, Ohio, USA). This layer had a thickness of approximately 50.8 μm (2 mil).

Layer 103 was a blend of 50% by weight of an ethylene vinyl acetate copolymer (EVA) having a 12% by weight vinyl acetate comonomer content, a density of 0.93 g/cm³ and a melt flow rate (190° C./2.16 kg) of 0.35 g/10 min, and 50% by weight of an ethylene vinyl acetate copolymer (EVA) having a 26.2% by weight vinyl acetate comonomer content, a density of 0.951 g/cm$^3$ and a melt flow rate (190° C./2.16 kg) of 2.3 g/10 min. Exemplary of such EVAs is ELVAX® 3135x supplied by E.I. du Pont de Nemours and Company, Inc. (Wilmington, Del., USA) and ESCORENE™ Ultra LD 768.MJ supplied by Exxon Mobil Chemical Company (Baytown, Tex., USA respectively. This layer had a thickness of approximately 8.13 μm (0.32 mil).

Layer 104 was a blend of 99% by weight of a high density polyethylene (HDPE) having density of 0.966 g/cm$^3$ and 1% by weight of a high density polyethylene masterbatch comprising 4% by weight of a high density polyethylene nucleation additive. Exemplary of a commercially available HDPE is SURPASS® HP167-AB supplied by Nova Chemical Company (Joffre, Alberta, Canada). Exemplary of a commercially available high density polyethylene masterbatch having a 4% high density polyethylene nucleation additive is POLYBATCH CLR 124 supplied by A. Schulman (Fairlawn, Ohio, USA). This layer had a thickness of approximately 50.8 μm (2 mil).

Layer 105 was 100% by weight of a cyclic olefin copolymer (COC) having density of 1010 kg/m$^3$, a heat deflection temperature under load (0.45 MPa) of about 75° C. and a glass transition temperature of 78° C. Exemplary of such a commercially available COC is TOPAS' 8007S-04 supplied by Celanese Corporation (Irving, Tex., USA). This layer had a thickness of approximately 15.24 μm (0.60 mil).

The film as described above had a total thickness of approximately 152.4 μm (6 mil) and an average water vapor transmission rate of 0.131 g/m$^2$/day at 100° F. (37.8° C.) and 90% relative humidity having a thickness of about 10 mil (254 micron) before being thermoformed.

Lidding Component

The following examples illustrate certain particular embodiments of a film for use as a lidding component structure suitable and are not to be interpreted as limiting. In the following examples, polymeric resin composition percentages are based on the total weight of each film layer. In the following examples, the film structures were produced using an extrusion coating apparatus and methods which are well known to those skilled in the art. The extrusion coating apparatus includes a multi-manifold flat die head through which a two-layer film composition was forced and extrusion coated onto the shiny surface of a metallic foil. The metallic foil was pre-treated prior to extrusion coating by printing a primer coat onto the matte surface of the foil.

Example 2-1

Example 2-1 is one embodiment of a laminate 300 of a lidding component film 12 as illustrated in FIG. 5 having a structure and layer compositions as described below:

Layer 301 was an aluminum foil. This layer had a thickness of approximately 25.4 μm (1 mil).

Layer 302 was 100% by weight of an ethylene acrylic acid copolymer (EAA) having a density of 0.94 g/cm$^3$, a melting point of 78° C., and a melt flow rate (190° C./2.16 kg) of 10 g/10 min. Exemplary of such a commercially available EAA is NUCREL® 3990 supplied by E.I. du Pont de Nemours and Company, Inc. (Wilmington, Del., USA).

Layer 303 (heat-seal layer) was a blend of 96% by weight of a modified ethylene acrylic acid copolymer (mod-EAA) having a density of 1.02 g/cm$^3$, a melting point of 97° C., and a melt flow rate (190° C./2.16 kg) of 13 g/10 min, and 4% by weight of a masterbatch comprising an ethylene methacrylate copolymer (mod-EMA) having a density of 0.94 g/cm$^3$, a melt flow rate (190° C./2.16 kg) of between 3 and 8 g/10 min, and a 1% by weight of a chill roll release additive. Exemplary of such a commercially available mod-EAA having a density of 1.02 g/cm$^3$, a melting point of 97° C., and a melt flow rate (190° C./2.16 kg) of 13 g/10 min is APPEEL® 20D828 supplied by E.I. du Pont de Nemours and Company, Inc. (Wilmington, Del., USA). Exemplary of such a commercially available mod-EMA is Ampacet 100578 Chill Roll Cop MB supplied by Ampacet Corporation, Inc. (Tarrytown, N.Y., USA).

Example 2-2

Example 2-2 is another embodiment of a laminate 300 of a lidding component film 12 as illustrated in FIG. 5 having a structure and layer compositions as described below:

Layer 301 and 302 were equivalent to those described above in Example 2-1.

Layer 303 (heat-seal layer) was a blend of 86% by weight of a modified ethylene acrylic acid copolymer (mod-EAA) having a density of 1.02 g/cm$^3$, a melting point of 97° C., and a melt flow rate (190° C./2.16 kg) of 13 g/10 min; 10% by weight of a modified ethylene acrylate copolymer (mod-EMA) having a density of 0.94 g/cm$^3$, a melt flow rate (190° C./2.16 kg) of 2.0 g/10 min, and a melting point of 91° C.; and 4% by weight of a masterbatch comprising an ethylene methacrylate copolymer (mod-EMA) having a density of 0.94 g/cm$^3$, a melt flow rate (190° C./2.16 kg) of between 3 and 8 g/10 min, and a 1% by weight of a chill roll release additive. Exemplary of such a commercially available mod-EAA having a density of 1.02 g/cm$^3$, a melting point of 97° C., and a melt flow rate (190° C./2.16 kg) of 13 g/10 min is APPEEL® 20D828 supplied by E.I. du Pont de Nemours and Company, Inc. (Wilmington, Del., USA). Exemplary of such a commercially available mod-EMA having a density of 0.94 g/cm$^3$, a melt flow rate (190° C./2.16 kg) of 2.0 g/10 min, and a melting point of 91° C. is BYNEL® 22E780 supplied by E.I. du Pont de Nemours and Company, Inc. (Wilmington, Del., USA). Exemplary of such a commercially available masterbatch mod-EMA having a chill roll release additive is Ampacet 100578 Chill Roll Cop MB supplied by Ampacet Corporation, Inc. (Tarrytown, N.Y., USA).

Example 2-3

Example 2-3 is another embodiment of a laminate 300 of a lidding component film 12 as illustrated in FIG. 5 having a structure and layer compositions as described below:

Layer 301 and 302 were equivalent to those described above in Example 2-1.

Layer 303 (heat-seal layer) was a blend of 85% by weight of a modified ethylene acrylic acid copolymer (mod-EAA) having a density of 1.02 g/cm$^3$, a melting point of 97° C., and a melt flow rate (190° C./2.16 kg) of 13 g/10 min; 10% by weight of a modified ethylene acrylate copolymer (mod-EMA) having a density of 0.94 g/cm3, a melt flow rate (190° C./2.16 kg) of 2.0 g/10 min, and a melting point of 91° C.; 4% of a masterbatch comprising an ethylene methacrylate copolymer (mod-EMA) having a density of 0.94 g/cm$^3$, a melt flow rate (190° C./2.16 kg) of between 3 and 8 g/10 min, and a 1% by weight of a chill roll release additive; and 1% by weight of a high density polyethylene masterbatch comprising 1% by weight of a high density polyethylene nucleation additive. Exemplary of such a commercially available mod-EAA having a density of 1.02 g/cm$^3$, a melting point of 97° C., and a melt flow rate (190° C./2.16 kg) of 13 g/10 min is APPEEL® 20D828 supplied by E.I. du Pont de Nemours and Company, Inc. (Wilmington, Del., USA). Exemplary of such a commercially available mod-EMA having a density of 0.94 g/cm3, a melt flow rate (190° C./2.16 kg) of 2.0 g/10 min. and a melting point of 91° C. is BYNEL® 22E780 supplied by E.I. du Pont de Nemours and Company, Inc. (Wilmington, Del., USA). Exemplary of such a commercially available masterbatch mod-EMA having a chill roll release additive is Ampacet 100578 Chill Roll Cop MB supplied by Ampacet Corporation, Inc. (Tarrytown, N.Y., USA). Exemplary of such a commercially available masterbatch of a high density polyethylene masterbatch comprising 1% by weight of a high density polyethylene nucleation additive is POLYBATCH® CLR 122 supplied by A. Schulman (Fairlawn, Ohio, USA).

The blister packages of the present invention can be manufactured using methods known in the art. Generally, the blister cavities are thermoformed from the blister components of the present invention in-line just prior to filling the cavities with a product to be packaged. The lidding component is then unwound from a roll and brought into contact with the formed and filled blister component such that the heat-seal layer of the lidding component contacts the blister component. The lidding and blister components are heat sealed, typically using a heated platen. Some areas of the package may not be sealed to provide a starting point for peeling off the lidding component prior to removing the product. If the lidding component is not pre-printed, printing is generally done just before heat sealing. After heat-sealing, the individual blisters may be perforated using methods known is the art so that they can removed at point of use.

What is claimed:

1. A blister component for a blister package, comprising: a multilayer thermoplastic film comprising:
   i. a first exterior layer comprising cyclic olefin copolymer (COC);
   ii. two interior layers each comprising a high density polyethylene (HDPE);
   iii. a central core layer; and
   iv. a second exterior layer comprising a material selected from the group consisting of cyclic olefin copolymer (COC), polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate (PETE) and polylactic acid (PLA).

2. A component according to claim 1, wherein the multilayer thermoplastic film is palindromic.

3. A component according to claim 1, wherein the two interior layers each have a thickness of between 38.1 μm to 190.5 μm (1.5 mil to 7.5 mil).

4. A component according to claim 1, wherein the two interior layers each comprise a bimodal high density polyethylene having a distribution of a low molecular weight region and a high molecular weight region.

5. A component according to claim 1, wherein the central core layer comprises an ethylene vinyl acetate copolymer.

6. A component according to claim 1, wherein the central core layer comprises an ethylene vinyl acetate copolymer having a 12% by weight vinyl acetate content.

7. A component according to claim 1, wherein each of the two interior layers have a thickness of at least 20% of the total thickness of the multilayer thermoplastic film.

8. A component according to claim 1, wherein each of the two interior layers have a thickness of at least 30% of the total thickness of the multilayer thermoplastic film.

9. A component according to claim 1, wherein each of the two interior layers have a thickness of at least 35% of the total thickness of the multilayer thermoplastic film.

10. A component according to claim 1, wherein each of the two interior layers comprises a high density polyethylene having a density of at least about 0.96 g/cm$^3$.

11. A component according to claim 1, wherein the central core layer is in direct contact with the two interior layers.

12. A component according to claim 1, wherein each of the two interior layers are in direct contact with an exterior layer.

13. A component according to claim 1, wherein the multilayer thermoplastic film has an average water vapor transmission rate of 0.110 g/m$^2$/day at 100° F. (37.8° C.) and 90% relative humidity having a thickness of about 10 mil (254 micron) before being thermoformed.

14. A component according to claim 1, wherein the two interior layers each further comprise a high density polyethylene nucleation additive.

15. A component according to claim 14, wherein the two interior layers each further comprise a hydrocarbon resin.

* * * * *

UNITED STATES PATENT AND TRADEMARK OFFICE
CERTIFICATE OF CORRECTION

PATENT NO. : 9,694,959 B2
APPLICATION NO. : 15/310856
DATED : July 4, 2017
INVENTOR(S) : Michael D. Priscal and Arthya Puguh It is certified that error appears in the above-identified patent and that said Letters Patent is hereby corrected as shown below:

On the Title Page

Column 2, item "(56)", under "Foreign Patent Documents", Line 2, delete "81" and insert -- B1 --, therefor.
Column 2, item "(57)", under "Abstract", Line 14, delete "38.1 pm to 190.5 pm" and insert -- 38.1 μm to 190.5 μm --, therefor.

In the Drawings

Sheet 4, Fig. 4, delete "101" and insert -- 201 --, therefor.
Sheet 4, Fig. 4, delete "102" and insert -- 202 --, therefor.
Sheet 4, Fig. 4, delete "103" and insert -- 203 --, therefor.
Sheet 4, Fig. 4, delete "104" and insert -- 204 --, therefor.
Sheet 4, Fig. 4, delete "105" and insert -- 205 --, therefor.
Sheet 4, Fig. 4, delete "106" and insert -- 206 --, therefor.
Sheet 4, Fig. 4, delete "107" and insert -- 207 --, therefor.
Sheet 4, Fig. 4, delete "108" and insert -- 208 --, therefor.
Sheet 4, Fig. 4, delete "109" and insert -- 209 --, therefor.
Sheet 4, Fig. 4, delete "110" and insert -- 210 --, therefor.
Sheet 4, Fig. 4, delete "111" and insert -- 211 --, therefor.
Sheet 4, Fig. 4, delete "112" and insert -- 212 --, therefor.
Sheet 4, Fig. 4, delete "113" and insert -- 213 --, therefor.

In the Specification

In Column 2, Line 1, delete "NB/B/A" and insert -- A/B/B/A --, therefor.
In Column 2, Line 16, delete "for wed" and insert -- formed --, therefor.
In Column 2, Line 50, delete "381" and insert -- 38.1 --, therefor.
In Column 4, Line 30, delete "(PETE)" and insert -- (PETG) --, therefor.

Signed and Sealed this
Ninth Day of October, 2018

Andrei Iancu
*Director of the United States Patent and Trademark Office*

In Column 4, Line 65-66, delete "[O-R-OC(O)-R-C(O)]," and insert -- [O-R-OC(O)-R'-C(O)]$_n$ --, therefor.
In Column 6, Line 6, delete "Ineas" and insert -- Ineos --, therefor.
In Column 6, Line 19, delete "863-664" and insert -- 863-864 --, therefor.
In Column 8, Line 11, delete "81140" and insert -- R1140 --, therefor.
In Column 8, Line 39, delete "Escorenem™" and insert -- Escorene™ --, therefor.
In Column 9, Line 61, delete "2032" and insert -- 203.2 --, therefor.

In the Claims

In Claim 1, Column 14, Line 3, delete "(PETE)" and insert -- (PETG) --, therefor.